Nov. 26, 1957 T. M. JACKSON ET AL 2,814,762

STEPPING CIRCUIT ARRANGEMENT USING TRIGGER DEVICES

Filed April 3, 1956

*Inventors*
T. M. JACKSON
E. A. F. SELL
By [signature]
*Attorney*

United States Patent Office 2,814,762

Patented Nov. 26, 1957

2,814,762

STEPPING CIRCUIT ARRANGEMENT USING TRIGGER DEVICES

Thomas Meirion Jackson and Eric Andreas Frederik Sell, London, England, assignors to International Standard Electric Corporation, New York, N. Y.

Application April 3, 1956, Serial No. 575,822

Claims priority, application Great Britain April 29, 1955

5 Claims. (Cl. 315—84.5)

This invention relates to stepping circuits of the type in which a plurality of shunt circuits are arranged in succession and are caused to operate in succession by the application of repetitive input pulses, each shunt circuit being adapted, when operating, to prepare the next adjacent circuit for operation when the next pulse is received.

It is one of the objects of the invention to provide a stepping circuit which may be operated at higher speeds than circuits heretofore used.

Another object of the invention is to provide a stepping circuit using gaseous discharge tubes in which possible trouble from spurious pulses originating when the discharge in a tube is turned on and off is prevented.

According to the present invention the stepping circuit comprises a succession of identical shunt circuits each including a gaseous discharge device having at least an anode, a cathode and a control electrode connected in series with a rectifier and a resistor, means for applying to the anodes of all of said devices in common a potential which is insufficient by itself to fire any of said devices but is sufficient to maintain the discharge in a previously-fired device, means for applying a negative-going pulse to the anodes of all of said devices to extinguish the discharging device, means for applying each said negative pulse to the control electrodes of said devices as well as to the anodes thereof, and, between each pair of adjacent identical shunt circuits, a connection via a capacitor from the resistor of the first shunt circuit of the pair to the cathode of the device of the second shunt circuit of the pair, the arrangement being such that when the device in the first shunt circuit of the pair is discharging the capacitor is charged by the voltage across the resistor of that shunt circuit and when said device is extinguished on the application of said pulse the charge in said capacitor is effectively applied to the device of the second shunt circuit of the pair in augmentation of said voltage applied in common to the anodes of said devices to an extent sufficient to fire the device of said second shunt circuit when the pulse ends, said rectifiers being so placed in the shunt circuits that between the extinction of the device of the first shunt circuit of the pair and the firing of the device of the second shunt circuit of the pair the only discharge path for the capacitor interconnecting those shunt circuits is through a rectifier in its high resistance condition, the application of said pulse to the control electrode of the second device of the pair ensuring that said second device cannot pass any current until the pulse ends, whereby said shunt circuits are operated one at a time in sequence in response to said pulses.

The above-mentioned and other features and objects of this invention and the manner of attaining them will become more apparent and the invention itself will be best understood by reference to the following description of an embodiment of the invention taken in conjunction with the accompanying drawings, in which.

The circuit of Fig. 1 will now be described. Each stage, which is one of a succession of identical shunt circuits, includes a gaseous discharge tube, such as K1, K2 . . . K9, K10. These tubes can be cold cathode tubes having anode, cathode and trigger electrode, or can be thyratrons. The third electrode, the trigger electrode of a cold cathode tube, will be hereinafter referred to as the control electrode. The control electrodes of all of these tubes are connected together and to a positive potential source via a resistor R1 and a metal rectifier MR1. The potential of this source, which supplies the bias for the trigger electrodes is arranged to be slightly below the control electrode-cathode breakdown voltage of the tube.

The circuits described herein all use cold-cathode gaseous discharge tubes of the G1/371K type, which are of the type described in the U. S. patent to G. H. Hough et al. No. 2,631,261. These tubes each have an anode, a trigger electrode (herein designated a control electrode) and a cathode, and also have an additional priming gap having an anode and a cathode, which priming gap is separated from the main or triode portion of the tube by a shield electrode. The circuits attached hereto show the shield electrodes but not the priming gaps.

Figure 1:
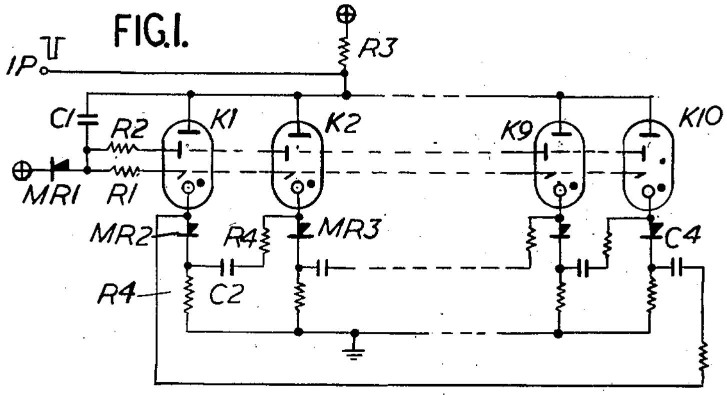
Fig. 1 shows a first circuit embodying the invention, in which stepping pulses are applied in common to the anodes of all tubes.

To return to the circuit of Fig. 1, the shield electrodes are connected together and to the junction of resistor R1 and rectifier MR1 via a resistor R2. The anodes of the tubes are connected together and to the positive supply terminal via a resistor R3, the lower end of R3 being connected via a capacitor C1 to the junction between rectifier MR1 and resistors R1 and R2 in the control and shield electrodes' biassing circuit. Stepping pulses are applied to the commoned anodes, as indicated at IP, and each of these pulses is also applied to all control electrodes and shield electrodes. The purpose of this will be described later.

In series with the cathode of each tube there is a rectifier and a resistor, for example MR2 and R4 for tube K1, the rectifier being so poled as to be in the direction of easy conductivity for current flowing away from the cathode of the tube. Adjacent shunt circuits are interconnected by circuits including a capacitor and a resistor in series, for example C2 and R5 for the interconnections between the first and second shunt circuits, each being connected between the junction between the rectifier and resistor of one shunt circuit and the junction between the tube and the rectifier of the next succeeding stage.

The operation of this circuit will now be described, first without reference to capacitor C1, and assuming that the resistors, such as R5, are not included in the circuit. The functions of these components will then be considered separately.

It will be assumed initially that the tube K1 is discharging, so that current flowing in its cathode circuit charges capacitors C2, interconnecting K1 and K2, and C4, interconnecting K10 and K1 (since the circuit is a closed ring, although it need not be). This current flow charges C2 in such a way that its right-hand end, connected to the cathode of K2, is negative, while the right-hand end of C4, which is connected to the cathode of K1, is positive.

When a negative-going impulse occurs on the input IP, it reduces the potential of the common point to which the anodes are connected to such an extent that tube K1 is extinguished. Capacitors C2 and C4 therefore both commence to discharge. C4 discharges fairly rapidly, since its discharge circuit includes rectifier MR2 in its forward, i. e. its low resistance, direction. The discharge circuit of C2, however includes the rectifier MR3 in its reverse, i. e. high resistance, direction, so the discharge of C2 is slow. The result of this is that when the negative pulse on IP ends, the cathode of tube K2 is at a potential which is significantly more negative than that of any other of the tubes. Therefore, when the anode potential of K2 returns to the positive value when the pulse ends, K2 fires. Thus, the negative pulse has stepped the discharging condition from the first to the second shunt circuit.

Now it is necessary to consider the purpose and effect of C1. It has been found that in a circuit such as Fig. 1, assuming that C1 is not present, there is a risk that under certain conditions, the control electrode-cathode gap will fire before the input pulse ends, which will discharge the cathode capacitor more rapidly than would otherwise be the case. This premature discharge can be avoided by careful choice of circuit parameters, but it means that the limits of the circuit tend to be relatively poor.

To overcome this disadvantage the negative going anode pulse is super-imposed on the control electrode bias, this being effected by the connection from the commoned anodes to the junctions of rectifier MR1 and resistor R1. The function of rectifier MR1 is, of course, to isolate the bias potential source from the pulse. The result of this arrangement is that the potential on the control electrode is held at a value such that the control electrode-cathode gap cannot fire until the trailing edge of the input pulse on IP.

It will be remembered that the tubes used in the circuit of Fig. 1 have shield electrodes which screen the main or triode gaps of the tubes from the primary gaps (not shown). These shield electrodes are positively biased so that shield-cathode breakdown could occur, which would also tend to discharge the coupling capacitor. To overcome this, the stepping pulse is applied, as shown in Fig. 1, to the commoned shield electrodes as well as to the control electrodes.

The circuit just described is satisfactory for speeds of operation up to 25 kc./s., above which there are limitations due to the rise times of the anode and cathode waveforms, and the effects of various stray capacitances. A gas tube stepping circuit is known in which the tubes are commoned into two alternate sets, whereby a further improvement in speed of reliable operation is obtained. This will be briefly described with reference to Fig. 2, in which this feature is embodied.

To return to Fig. 1, the purpose of the resistors, such as R5, in the inter-shunt coupling circuits has not been described as yet. In the circuit shown certain spurious pulses are produced, including a positive pulse when a discharge is initiated and a negative pulse when a discharge is extinguished. These spurious pulses can also casue trouble in certain circumstances, particularly when working at relatively high speeds, and to overcome some of their effects the resistor, such as R5, is included in each coupling circuit. This is chosen to be approximately equal to R4, and halves the peak of the spurious positive pulse. This also produces some reduction of the negative voltage on the cathode of the next tube but this is not sufficient to have any adverse effect on operation. The effect of the negative spurious pulse is eliminated by a circuit feature to be described with reference to Fig. 3 below.

Figure 2:
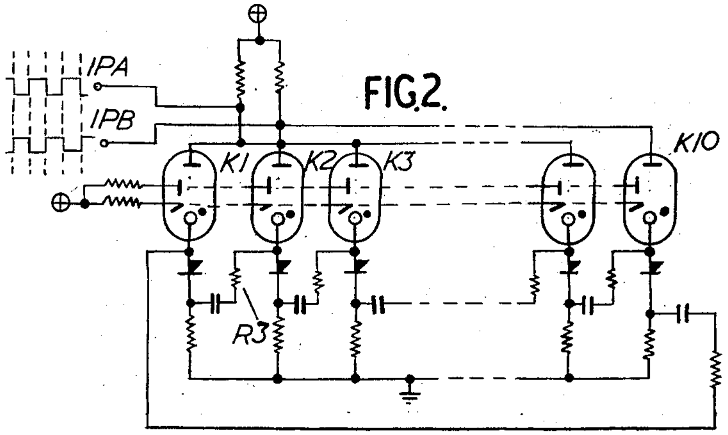
Fig. 2 shows a second circuit embodying the invention, in which the anodes of alternate tubes are connected respectively to two input terminals to which impulses are alternately applied.

In the circuit of Fig. 2, the coupling circuits between adjacent shunt circuits each include a resistor, such as R5, the purpose of which has already been described. This circuit also has a double-pulse input, whereby the tubes are connected into two alternate sets, each set having its own anode load and its own input. As shown by the waveforms drawn by the inputs IPA and IPB, these two sets of tubes are pulsed in antiphase, so that when K1 is discharging, if the potential on IPA goes negative, that on IPB goes positive. Hence, K1 is extinguished, and at the same time the anodes of K2 and K10 are positive. However, the interstage coupling circuits ensure that the cathode of K2 is significantly negative to that of K10, so that in this case K2 fires. Thus each reversal of the potential conditions of IPA and IPB transfers the discharging condition one stage along the stepping circuit. This increases the operating speed of the circuit since each tube can deionise while the next tube is discharging.

Figure 3:
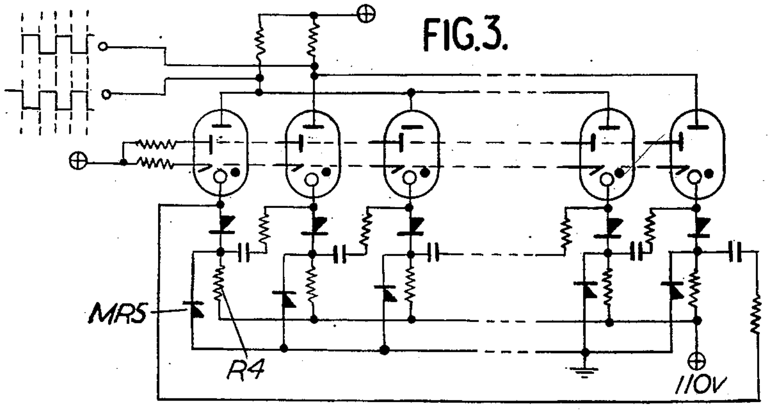
Fig. 3 shows a modification of the circuit of Fig. 2.

The circuit of Fig. 3 includes a feature additional to that of the circuit of Fig. 2, which is that the lowermost ends of the shunt circuits go to a more negative potential, −110 volts, while the upper end of each resistor, such as R4, is connected via a "catching" rectifier, such as MR5, to a voltage positive to that of the lower ends of the shunt circuits, as shown, earth.

This acts in the well-known manner to eliminate spurious negative pulses, permitting a further increase in operating speed.

The feature of Fig. 1 whereby the input pulses are applied to control electrodes and shield electrodes can also be applied to a circuit, such as that of Fig. 2 or Fig. 3. In this case the control electrodes and shield electrodes of alternate tubes would be connected to separate biasing supplies, and the commoned anode loads would each be capacitively coupled to the appropriate commoned control electrodes and shield electrodes.

The resistor included in series with the interstage coupling capacitor is a feature which could clearly be included in other known stepping circuits, as is the catching rectifier circuit, shown in Fig. 3.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A stepping circuit comprising a plurality of shunt circuits arranged in succession, each circuit including a gas discharge device having an anode, a cathode, and a control electrode, a rectifier and a resistor connected in series to the cathode of each of said discharge devices with said rectifier connected to the cathode and poled in the direction of easy conductivity for current flow away from said cathode, a source of potential, means for applying a positive potential from said source to the anodes of said tubes, means for connecting the outer ends of said resistors together and to a potential from said source more negative than said positive potential, means for applying a biassing potential to the control electrodes of said tubes, interstage coupling circuits, each comprising a capacitor and a resistor in series, for connecting each shunt circuit with the next adjacent shunt circuit, each interstage coupling circuit being connected between the juncture of the rectifier and resistor in the cathode circuit of one discharge device and the cathode of the next adjacent discharge device, means for applying input pulses to the anodes of said devices, and means for applying the input pulses to said control electrodes as well as to said anodes of said discharge devices.

2. A stepping circuit, as defined in claim 1, further comprising a shield for a priming electrode in each of said discharge devices, and means for applying the input pulses to all of said shield electrodes.

3. A stepping circuit comprising a plurality of shunt circuits arranged in succession, each circuit including a gas discharge device having an anode, a cathode, and a control electrode, a rectifier and a resistor connected in series to the cathode of each of said discharge devices with said rectifier connected to the cathode and poled in the direction of easy conductivity for current flow away from said cathode, a source of potential, means for applying a positive potential from said source to the anodes of said tubes, means for connecting the outer ends of said resistors together and to a potential from said source more negative than said positive potential, means for applying a biassing potential to the control electrodes of said tubes, interstage coupling circuits, each comprising a capacitor and a resistor in series, for connecting each shunt circuit with the next adjacent shunt circuit, each interstage coupling circuit being connected between the juncture of the rectifier and resistor in the cathode circuit of one discharge device and the cathode of the next adjacent discharge device, means for applying input pulses to the anodes of said devices, the discharge devices being arranged in two groups with alternate discharge devices having their anodes connected together, and a separate load resistor for the anodes of each group of devices, the means for applying input pulses to said anodes applying said input pulses alternately to said anodes of said two groups.

4. A stepping circuit, as defined in claim 3, further comprising a shield for a priming electrode in each of said discharge devices, and means for biassing said shields to the same potential as said control electrodes.

5. A stepping circuit, as defined in claim 3, further comprising a second rectifier connected to the juncture of each first-mentioned rectifier and resistor, said second rectifier being poled in the direction of easy conductivity for current flowing towards said juncture, and means for connecting the other sides of said second rectifiers together and to a potential from the source between the positive potential applied to the anodes and the negative potential applied to the resistors in the cathode circuits.

References Cited in the file of this patent

UNITED STATES PATENTS 2,646,534 Manley ---------------- July 21, 1953